US011307971B1

(12) United States Patent
Weldemariam et al.

(10) Patent No.: US 11,307,971 B1
(45) Date of Patent: Apr. 19, 2022

(54) COMPUTER ANALYSIS OF SOFTWARE RESOURCE LOAD

(71) Applicant: International Business Machines Corporation, Armonk, NY (US)

(72) Inventors: Komminist Weldemariam, Ottawa (CA); Smitkumar Narotambhai Marvaniya, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/302,576

(22) Filed: May 6, 2021

(51) Int. Cl.
*G06F 11/36* (2006.01)
*G06F 16/23* (2019.01)
*G06F 8/77* (2018.01)
*G06F 8/75* (2018.01)

(52) U.S. Cl.
CPC ............ *G06F 11/3684* (2013.01); *G06F 8/75* (2013.01); *G06F 8/77* (2013.01); *G06F 11/3688* (2013.01); *G06F 16/2379* (2019.01)

(58) Field of Classification Search
CPC .... G06F 11/3684; G06F 16/2379; G06F 8/75; G06F 8/77; G06F 11/3688
See application file for complete search history.

(56) References Cited

U.S. PATENT DOCUMENTS

| | | | |
|---|---|---|---|
| 7,093,238 B2 | 8/2006 | Givoni | |
| 7,496,904 B2 | 2/2009 | Srivastava | |
| 7,840,844 B2 | 11/2010 | Garland | |
| 8,527,813 B2 | 9/2013 | Budnik | |
| 8,924,938 B2 | 12/2014 | Chang | |
| 9,524,463 B2 | 12/2016 | Meinrenken | |
| 9,614,743 B2 | 4/2017 | Htay | |
| 9,886,370 B2 | 2/2018 | Doss | |
| 10,318,667 B2 | 6/2019 | Dusanapudi | |

(Continued)

FOREIGN PATENT DOCUMENTS

WO 2018029668 A1 2/2018

OTHER PUBLICATIONS

Sanath.S.Shenoy. "Green Software Development Model An Approach towards Sustainable Software development", Dec. 2011, IEEE (Year: 2011).*

(Continued)

*Primary Examiner* — Wei Y Zhen
*Assistant Examiner* — Amir Soltanzadeh
(74) *Attorney, Agent, or Firm* — Michael A. Petrocelli

(57) ABSTRACT

Generation of a set of carbon-aware test cases based on a software resource load includes receiving, by one or more processors, a source code and identifying code changes on the received source code using code analysis technology. The code changes are used to select a plurality of code snippets from the source code. The one or more processors calculate metrics associated with an energy consumption of each of the plurality of code snippets and an amount of carbon dioxide emissions equivalent to the calculated metrics. The calculated equivalent amount of carbon dioxide emissions associated with each of the plurality of code snippets is displayed by the one or more processors on the source code for automatically generating the set of test carbon-aware test cases based on the calculated amount of carbon dioxide emissions and predefined carbon emissions constraints.

20 Claims, 15 Drawing Sheets

(56) References Cited

U.S. PATENT DOCUMENTS

| | | | |
|---|---|---|---|
| 10,783,403 B2 | 9/2020 | Chandra Sekar Rao | |
| 2006/0230320 A1 | 10/2006 | Salvador | |
| 2012/0233614 A1* | 9/2012 | Adler | G06F 11/3676 718/100 |
| 2015/0347274 A1* | 12/2015 | Taylor | G06F 11/3664 717/125 |
| 2017/0212829 A1 | 7/2017 | Bales | |
| 2019/0294528 A1 | 9/2019 | Avisror | |
| 2020/0019488 A1 | 1/2020 | Singh | |
| 2021/0374561 A1* | 12/2021 | Krishnamoorthy | G06N 5/04 |

OTHER PUBLICATIONS

"Combatting climate change with code", Parker Software, © 2019, 5 pages, <https://www.parkersoftware.com/blog/combatting-climate-change-with-code/>.

"System and Method to Measure Resource Usage Among Multiple Clouds with Efficacy Indexing", An IP.com Prior Art Database Technical Disclosure, Disclosed Anonymously, IP.com No. IPCOM000263962D, IP.com Electronic Publication Date: Oct. 27, 2020, 6 pages, <https://priorart.ip.com/IPCOM/000263962>.

Alon, et al., "code2vec: Learning Distributed Representations of Code", arXiv:1803.09473v5, Oct. 30, 2018, 30 pages, <https://arxiv.org/pdf/1803.09473.pdf>.

Hao, Karen, "Training a single AI model can emit as much carbon as five cars in their lifetimes", MIT Technology Review, Jun. 6, 2019, 4 pages, <https://www.technologyreview.com/2019/06/06/239031/training-a-single-ai-model-an-emit-as-much-carbon-as-five-cars-in-their-lifetimes/>.

Mell, et al., "The NIST Definition of Cloud Computing", National Institute of Standards and Technology, Special Publication 800-145, Sep. 2011, 7 pages.

Shukla, Gaurav, "What You Can Do To Reduce the Carbon Footprint of Your Website", VWO blog, Last Updated May 3, 2021, 26 pages, <https://vwo.com/blog/reduce-website-carbon-footprint/>.

* cited by examiner

Figure 2:
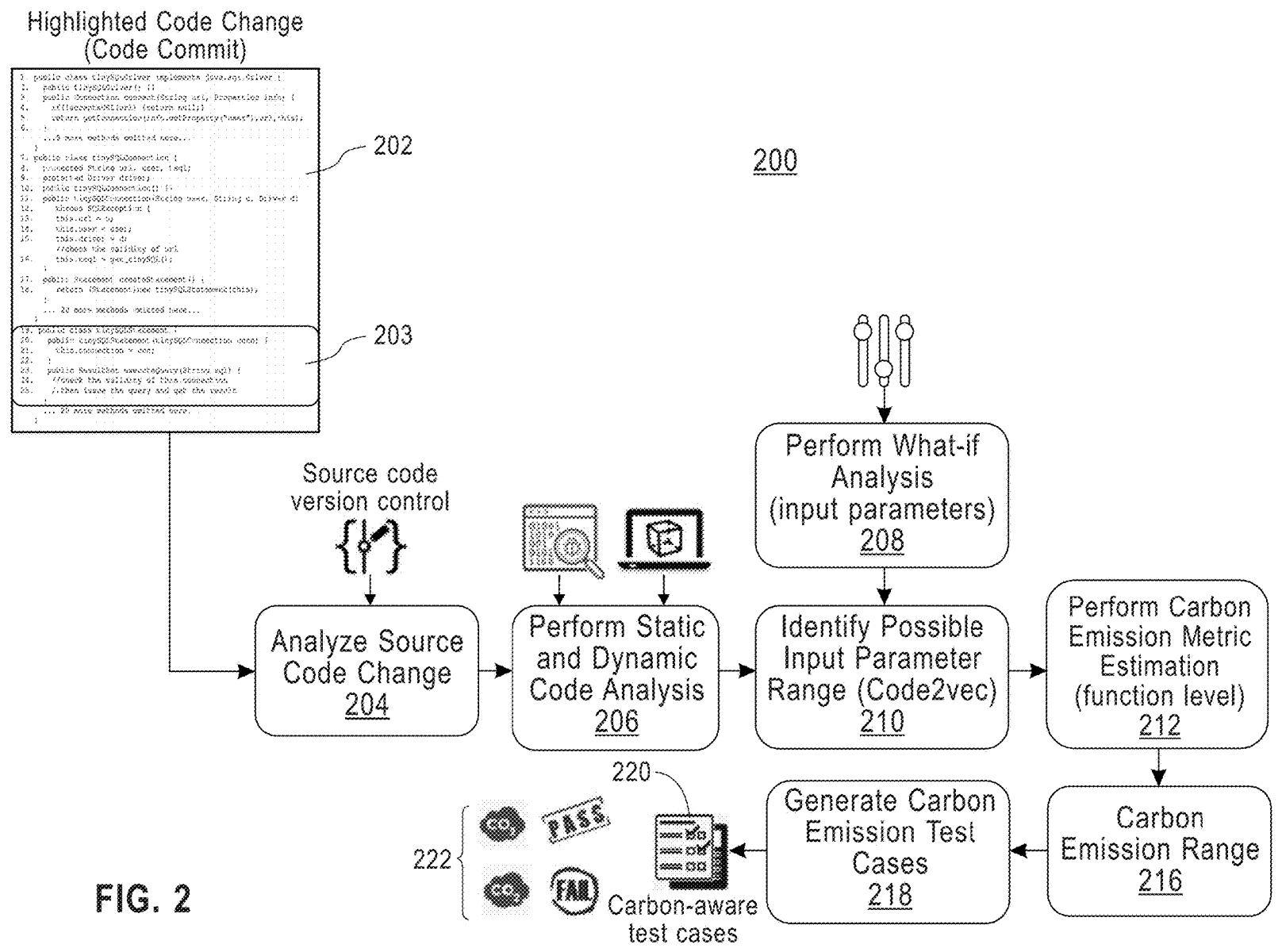

Highlighted Code Change
(Code Commit)

202

203

Analyze Source Code Change
204

Source code version control

Perform Static and Dynamic Code Analysis
206

Perform What-if Analysis (input parameters)
208

Identify Possible Input Parameter Range (Code2vec)
210

Perform Carbon Emission Metric Estimation (function level)
212

Carbon Emission Range
216

Generate Carbon Emission Test Cases
218

220

222 Carbon-aware test cases

|  | Test$_1$ | Test$_2$ | Test$_3$ |
|---|---|---|---|
| Test$_1$ |  |  |  |
| Test$_2$ | -- |  |  |
| Test$_3$ | -- | -- |  |

|  | Test$_1$ | Test$_2$ | Test$_3$ |
|---|---|---|---|
| Test$_1$ | 0 \| 1 | 1 \| 0 | 1 \| 0 |
| Test$_2$ | -- | 1 \| 0 | 1 \| 0 |
| Test$_3$ | -- | -- | 1 \| 0 |

|  | Test$_1$ | Test$_2$ | Test$_3$ |
|---|---|---|---|
| Test$_1$ | NA \| 15 | 40 \| NA | 50 \| NA |
| Test$_2$ | -- | 30 \| NA | 40 \| NA |
| Test$_3$ | -- | -- | 50 \| NA |

|  | Test$_1$ | Test$_2$ | Test$_3$ |
|---|---|---|---|
| Test$_1$ | 0 \| 2 | 2 \| 0 | 2 \| 0 |
| Test$_2$ | -- | 2 \| 0 | 2 \| 0 |
| Test$_3$ | -- | -- | 2 \| 0 |

|  | Test$_1$ | Test$_2$ | Test$_3$ |
|---|---|---|---|
| Test$_1$ | NA \| 16 | 42 \| NA | 52 \| NA |
| Test$_2$ | -- | 33 \| NA | 43 \| NA |
| Test$_3$ | -- | -- | 49 \| NA |

|  | Test$_1$ | Test$_2$ | Test$_3$ |
|---|---|---|---|
| Test$_1$ | 140 \| 60 | 190 \| 10 | 162 \| 38 |
| Test$_2$ | -- | 170 \| 30 | 185 \| 15 |
| Test$_3$ | -- | -- | 148 \| 52 |

|  | Test$_1$ | Test$_2$ | Test$_3$ |
|---|---|---|---|
| Test$_1$ | 13 \| 20 | 39 \| 54 | 50 \| 67 |
| Test$_2$ | -- | 36 \| 49 | 47 \| 76 |
| Test$_3$ | -- | -- | 53 \| 80 |

$P(A_{pass}^{carbon}/B_{fail}^{carbon}) := P(A_{pass}^{carbon}) P(B_{fail}^{carbon})$ $P(A_{pass}^{carbon}/B_{fail}^{carbon}) = P(A_{pass}^{carbon}, B_{fail}^{carbon}) / P(B_{fail}^{carbon})$ $P(B_{fail}^{carbon}/A_{pass}^{carbon}) = P(A_{pass}^{carbon}, B_{fail}^{carbon}) / P(A_{fail}^{carbon})$ $P(A_{pass}^{carbon}/B_{fail}^{carbon}) > P(A_{pass}^{carbon}) P(B_{fail}^{carbon})$
→
test B will be run first and test A

$P(A_{fail}/B_{fail}) := P(A_{fail}) P(B_{fail})$ $P(A_{fail}/B_{fail}) = P(A_{fail}, B_{fail}) / P(B_{fail})$ $P(B_{fail}/A_{fail}) = P(A_{fail}, B_{fail}) / P(A_{fail})$ $P(A_{fail}/B_{fail}) > P(A_{fail}) P(B_{fail})$
→
test B will be run first and test A

In response to a test case prioritization request, predict, by a computer, a failure of at least one test case in a set of test cases based on a failure of a different test case using conditional probability
1102

↓

Based on the predicted failure, determine a dependency between at least two test cases in the set of test cases
1104

↓

Based on the determined dependency, arrange the set of test cases in a new order of importance
1106

FIG. 11

COMPUTER ANALYSIS OF SOFTWARE RESOURCE LOAD

BACKGROUND

The present invention generally relates to the field of software development technologies, and more particularly to analyzing, using a computer, software resource load for generating a set of test cases and prioritizing dependencies between them.

Electricity can be a proxy for carbon generation because most electrical energy is still created through the burning of fossil fuels. This has caused energy consumption of computing systems becoming a major concern mainly due to costs, environmental concerns and policy, and reduction of carbon footprint. Traditional approaches for reducing energy consumption of computing systems focus at either the operational level (e.g., powering down all or part of systems) or at the hardware design level (e.g., using specialized low-energy components).

Currently, the development of energy-efficient software applications provides an alternative to traditional approaches for reducing energy consumption. Specifically, energy-efficient software may help determine the energy consumption of a computer application and understanding where the energy usage lies. However, in most cases, energy-efficient software solutions are based on training neural networks using versions of source code that may include potential defects and performing code modifications to address those potential defects. Furthermore, existing energy-aware software solutions generate test cases according to functional, service, and/or performance requirements defined by a user such as quality engineers associated with a software product or application. Most of these technologies are based on performance and validating criteria related to code coverage, branch ratio and satisfying test cases against a set of input/output requirements that overlook software resource load and estimation of carbon emission metrics.

SUMMARY

Shortcomings of the prior art are overcome and additional advantages are provided through the provision of a computer-implemented method for automatically generating and executing a set of test cases for verifying carbon emission tests. The method includes receiving, by one or more processors, a source code and identifying code changes on the received source code using code analysis technology. The code changes are used to select a plurality of code snippets from the source code. The one or more processors calculate metrics associated with an energy consumption of each of the plurality of code snippets and an amount of carbon dioxide emissions equivalent to the calculated metrics. The calculated equivalent amount of carbon dioxide emissions associated with each of the plurality of code snippets is displayed by the one or more processors on the source code and used for automatically generating the set of test cases based on the calculated amount of carbon dioxide emissions and predefined carbon emissions constraints.

Another embodiment of the present disclosure provides a computer program product for automatically generating and executing a set of test cases for verifying carbon emission tests, based on the method described above.

Another embodiment of the present disclosure provides a computer system for automatically generating and executing a set of test cases for verifying carbon emission tests, based on the method described above.

BRIEF DESCRIPTION OF THE DRAWINGS

The following detailed description, given by way of example and not intended to limit the invention solely thereto, will best be appreciated in conjunction with the accompanying drawings, in which:

FIG. 2 depicts a computer system for generation of carbon-aware test cases, according to an embodiment of the present disclosure;

FIGS. 8A-8G depict examples of test cases arranged into a triangular matrix, according to an embodiment of the present disclosure;

FIGS. 9A-9B depict an example of test case failure prediction using conditional probability, according to an embodiment of the present disclosure;

FIG. 11 is a flowchart depicting the steps of a computer-implemented method for prioritization of test case dependencies, according to an embodiment of the present disclosure;

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
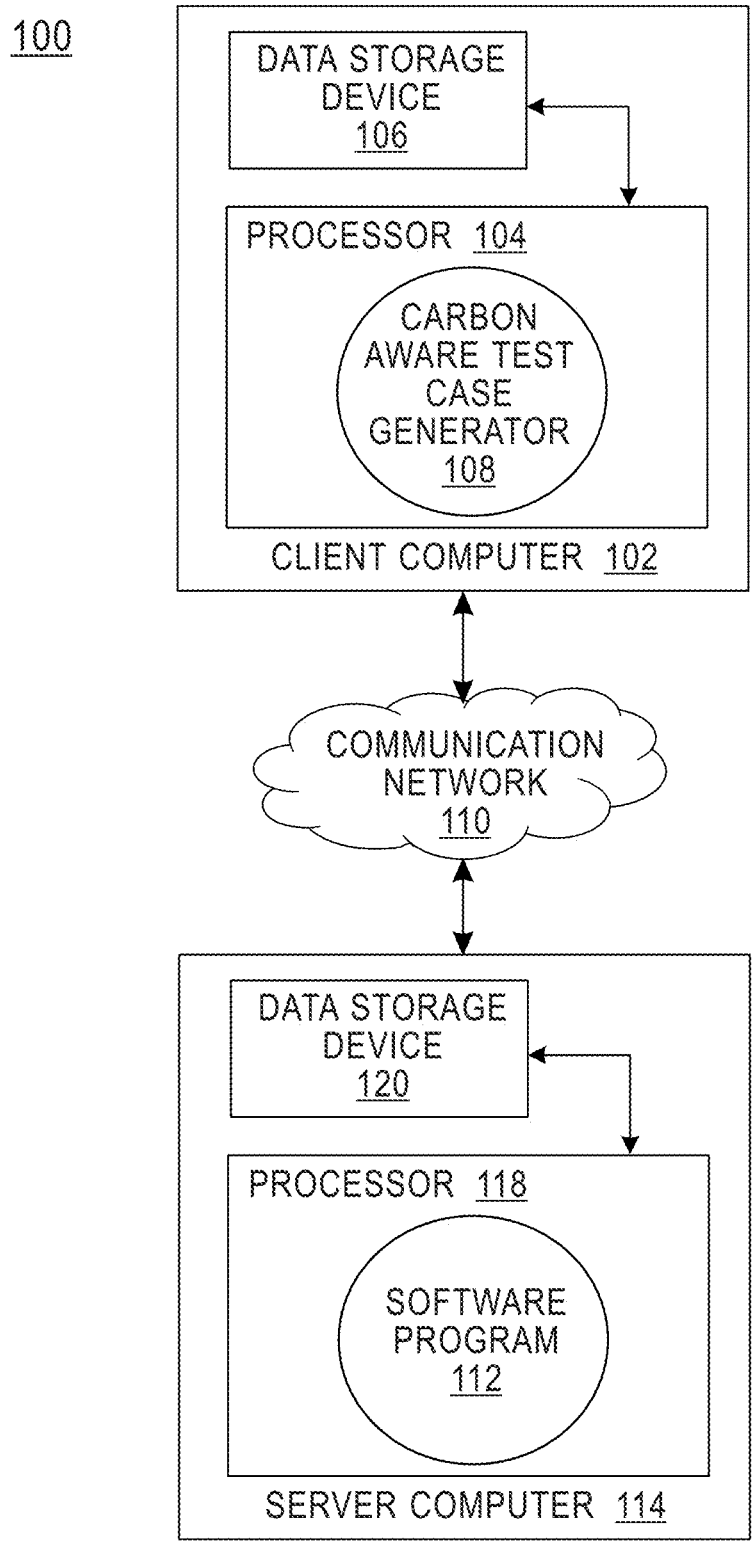
FIG. 1 is a block diagram illustrating a networked computer environment, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Existing solutions for assessing the sustainability of software applications lack the automatic generation of test cases specifically design for estimating greenhouse gas (GHG) emissions, particularly carbon dioxide ($CO_2$) emissions (hereinafter "carbon emissions"), and verify compliance with current GHG regulations. Embodiments of the present invention provide a method, system, and computer program product for automatically generating and executing a set of test cases for verifying GHG emission tests and estimating dependencies between test cases. Specifically, the following described exemplary embodiments provide a system, method, and computer program product to, among other things, automatically create a set of test cases by a carbon-aware test case generator system that dynamically tracks code changes, code commits, pull requests, and performs carbon-aware tests on a plurality of code snippets. The proposed carbon-aware test case generator system assigns a label or tag (e.g., green, yellow and red) based on the carbon emission test results to the plurality of code snippets for indicating a failed or passed status.

More specifically, the proposed carbon-aware test case generator system can highlight code snippets based on carbon-aware metrics to enable automatically creating carbon-aware test cases, and notify code developer(s) of carbon emission compliance. This can be used for future carbon emission compliant source code or product verification/validation. Additionally, the proposed embodiments can automatically receive feedback from developer(s)/user(s) using a chat bot or graphical user interface (GUI) via which current and predicted carbon emission criteria can be specified in real-time and incorporated into the generated carbon-aware test cases.

Thus, the present embodiments have the capacity to improve the technical field of software development by automatically generating, via a carbon-aware test case generator system, a set of test cases using machine learning techniques for verifying carbon emission tests based on identified carbon emission metrics and current carbon emission regulations. The proposed embodiments can also estimate and assign a risk score based on a carbon efficiency to software applications according to, for example, brand reputation, potential loss customer loss, personal reputation risk, monetary risk, etc., and a probability of test case failure, this carbon-aware risk score can then be used for rating code developers according to their carbon-aware (i.e., sustainable) coding skills.

Further, the proposed embodiment may be used for creating and updating an open standard (e.g., GHG protocol) compliance database of sustainable code test cases including a carbon-aware coverage plan. For illustration purposes only, without intent of limitation, the following embodiments are described using carbon dioxide emissions as the main metric. However, it can be understood that the described embodiments can be utilized to develop test cases for tracking emissions of any other greenhouse gas (e.g., methane ($CH_4$), nitrous oxide ($N_2O$), etc.) during software development. As known by those skilled in the art, a carbon footprint is the total greenhouse gas (GHG) emissions caused by an individual, event, organization, service, or product, expressed as carbon dioxide equivalent.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104, that is enabled to run a carbon-aware test case generator program 108, and a data storage device 106. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a processor 118, that is enabled to run a software program 112, and a data storage device 120. In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The carbon-aware test case generator program 108 running on client computer 102 may communicate with the software program 112 running on server computer 114 via the communication network 110. As will be discussed with reference to FIG. 13, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Referring now to FIG. 2, an exemplary implementation of a computer system 200 for generating and executing carbon-aware test cases is shown, according to an embodiment of the present disclosure. In this embodiment, the computer system 200 is an artificial intelligence (AI) based computer system for automatically creating and executing carbon-aware test cases against DevOps code commit actions. The computer system 200 is capable of generating a notification for reporting a status of a carbon emission test (e.g., success/failure) to a user or code developer.

As known by those skilled in the art, a test case is a set of actions executed to verify a particular feature or functionality of a software application. Test cases include specific variables or conditions, based on which expected and actual results can be compared to determine whether a software product is functioning as per the requirements of the customer. In the following described embodiments, carbon-aware test cases refer to test cases created specifically for identifying a software resource load, i.e., energy consumption during execution, and an equivalent amount of carbon dioxide emissions (carbon footprint) associated with the software execution. As mentioned above, the carbon footprint includes total GHG emissions including carbon-containing gases (i.e., carbon dioxide and methane) emitted through, for example, electricity consumption, burning of fossil fuels, manufactured goods, materials, wood, roads, buildings, transportation, etc.

By doing this, the generated carbon-aware tests cases provide a way to determine whether the software code complies with existing carbon emission constraints. The computer system 200 generates carbon-aware test cases, tracks a status of the test results (i.e., passed or failed), and provides real-time feedback to users and code developers based on which modifications can be conducted to reduce software resource load and hence carbon emissions, which translates in improved software sustainability. It should be noted that a test case is termed "passed" when the output from the software code exactly matches the expected output. Otherwise, the test case is termed "failed". It should also be noted that a passed carbon-aware test case complies with both execution performance and carbon emission regulations, while a failed carbon aware test case may comply with execution performance, but not with carbon emission constraints.

According to an embodiment, the computer system 200 receives a source code 202 including comments associated with source code changes. The computer system 200 tracks code changes by using a code version control system (not shown) such as, for example, GIT, SVN, etc. This may help tracking carbon emission changes with respect to code and functionality changes. In this embodiment, the computer system 200 may highlight or mark portions of the source code (i.e., code snippets) including code changes (e.g., source code portion 203), as illustrated in the figure.

The computer system 200 takes each highlighted source code snippet (203) and analyzes the determined source code changes (204) according to code commits, pull requests, and current and predicted carbon emission metrics (e.g., carbon emissions should not exceed 60 kg of $CO_2$ per day). Specifically, the computer system 200 analyzes the source code being developed by tracking code commits and pull request via the code version control system. Highlighting code snippets based on equivalent carbon emission metrics enables the automated generation of carbon-aware test cases. Static and dynamic source code analysis technology (e.g., SonarQube and OverOps) can be used to perform code analysis on the source code 202 focused on carbon emission metrics. In some embodiments, machine learning based methods specific for determining carbon emission metrics can also be employed to analyze the source code 202.

According to an embodiment, the computer system 200 analyzes the highlighted code snippets (203) along with code comments and provides recommendations for variable initialization, variable data types, etc., for minimizing source code carbon emissions and satisfying constraints related to user's performance.

The computer system 200 performs an static and dynamic code analysis (206) while generating multiple what-if queries (208) on a plurality of input parameters. Based on the static and dynamic code analysis (206) and what-if queries (208), the computer system 200 identifies a possible input parameter range (210) and estimates carbon emission metrics (212) at a function level by identifying, for example, an executeQuery( ) function that is associated with a higher carbon emission rate. In an embodiment, for example, the computer system 200 identifies the executeQuery( ) function while varying different inputs for the SQL query.

According to an embodiment, the plurality of input parameters may include code changes identified using the version control system, and computer infrastructure details (since carbon emissions are a function of the energy consumed by the computer infrastructure). Using what-if queries (counterfactual) analysis at 208, the computer system 200 identifies how carbon emissions can vary when actual values (argument) for each function change. Possible parameter ranges can be identified from existing test cases, code documentation, code comments, etc. This may help estimating a carbon emission range.

According to an embodiment, carbon footprint requirements for the overall source code can be specified by a user using, for example, a graphical user interface (GUI) prior to source code migration and/or transformation. The carbon footprint data associated with the source code can be inferred or learned from existing carbon footprint databases based on characteristics of the source code and a context in which the source code will be used.

Figure 3:
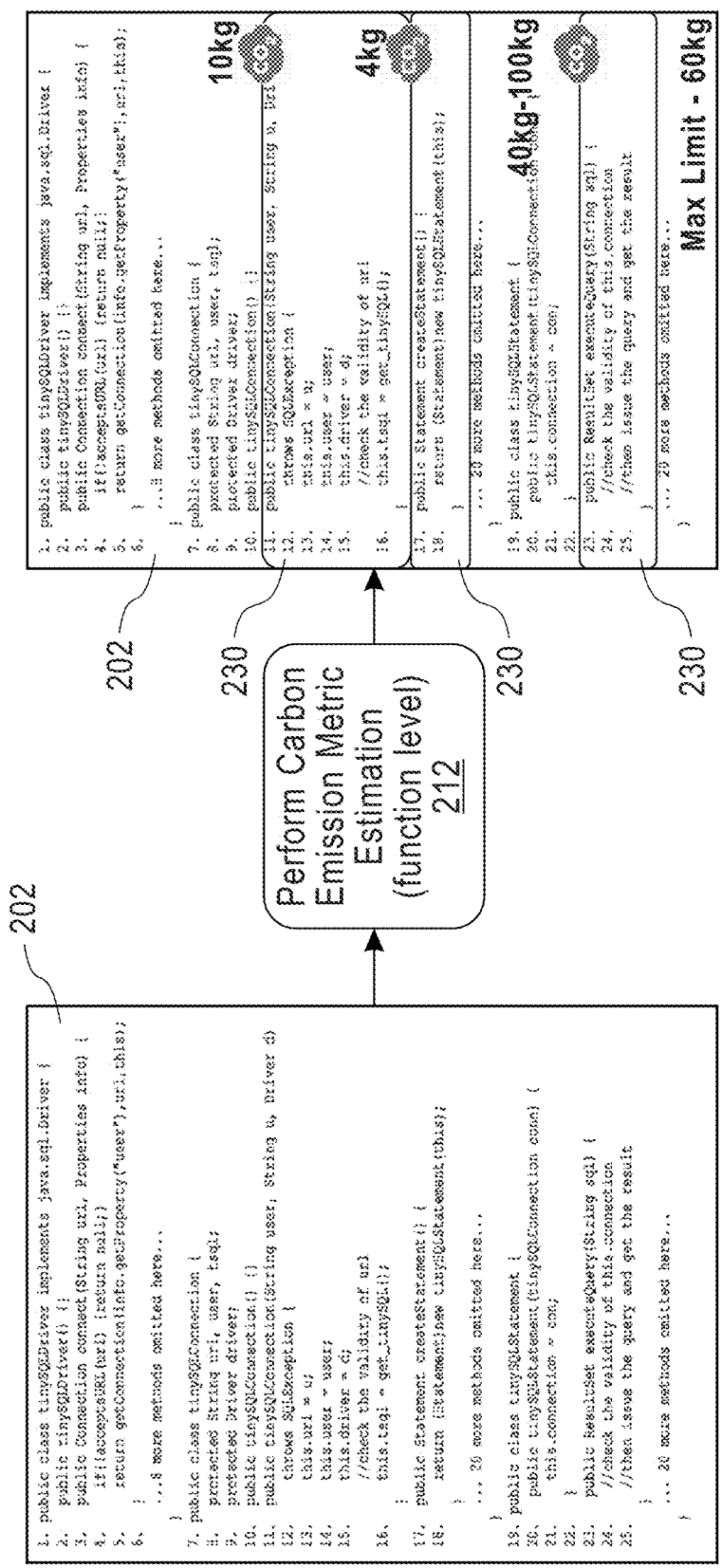
FIG. 3 depicts carbon emission metric estimation by the computer system of FIG. 2, according to an embodiment of the present disclosure.

Based on the estimated carbon emission metrics (212) and a carbon emission range (216), the computer system 200 identifies parts of the source code 202 that do not comply with predefined carbon emission constraints, and suggest changes to the source code that can improve code compliance. For example, FIG. 3 shows the source code 202 after identifying parts needing optimization based on the calculated carbon emission metrics (212). Specifically, the computer system 200 estimates carbon emission metrics (212) at the function level by recognizing in the source code (202) an amount of energy (e.g., kilowatts-hour of electricity) used during code execution, and identifies code snippets 230 consuming the highest amount of energy. The computer system 200 may then convert the energy consumed by each of the identified code snippets to an equivalent amount of emitted $CO_2$ (e.g., kilograms of $CO_2$) and displays an indication to the user or code developer with the estimated amount, as illustrated in FIG. 3. In some embodiments, the displayed indication may include highlighting the code snippets 230 requiring optimization, adding a label or tag indicating not compliance with carbon regulations, and/or the amount of equivalent $CO_2$ emitted by each of the code snippets 230, as illustrated in FIG. 3. Existing greenhouse gases databases and equivalencies calculators can be used to estimate the equivalent amount of $CO_2$ generated by code snippets 230 of the source code 202.

With continued reference to FIG. 2, once the computer system 200 determines which parts of the source code 202 have higher carbon emissions, a set of test cases can be generated (218) for carbon emission estimation (i.e., carbon-aware test cases). The computer system 200 subsequently executes the generated carbon-aware test cases (220) to minimize and track the overall carbon footprint of the source code 202. In some embodiments, a notification (222) indicating a result of each of the carbon-aware test cases can be displayed to the user or code developer for reporting a failed or successful (passed) test result.

Figure 4:
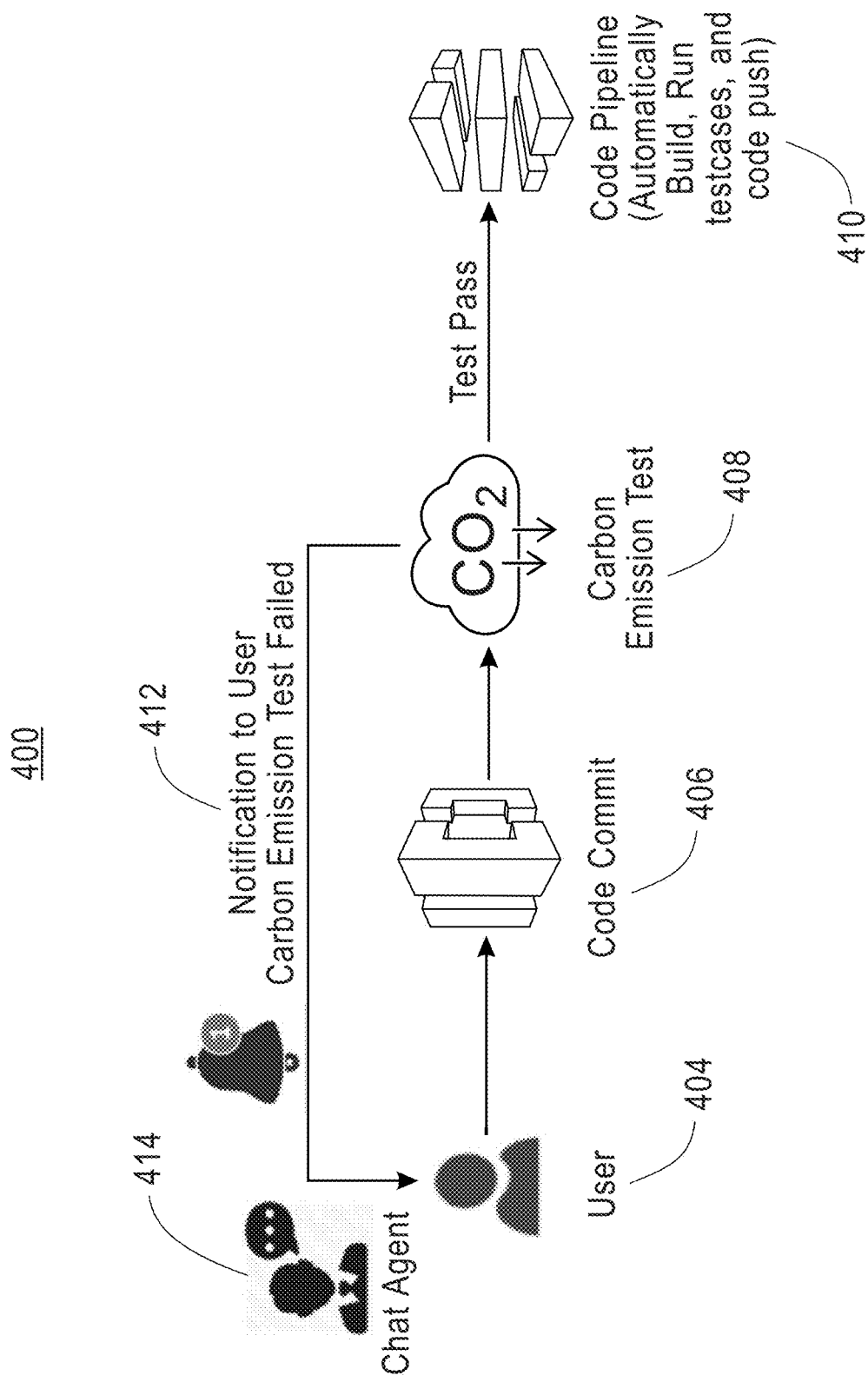
FIG. 4 depicts dynamically tracking code changes by the computer system of FIG. 2 for verifying compliance with carbon emission constraints, according to an embodiment of the present disclosure.

FIG. 4 depicts a high-level diagram illustrating dynamically tracking source code changes by the computer system 200 of FIG. 2 at a code commit/pull request level for verifying carbon emission constraints and minimizing source code overall carbon footprint. As explained above, carbon-aware test cases (408) are generated based on user's code commit (406) along with pull request activity and the estimation of carbon metrics from the plurality of code snippets 230. In this exemplary embodiment, when the test cases have passed the carbon emission test (408) the computer system 200 automatically builds and runs test cases and code push (410). In instances where the carbon emission test (408) fails, the computer system 200 may, for example, send a notification (412) to the user (404) and activate a chat bot/agent (414) for the user to receive the notification and provide real-time feedback that can be used for updating the source code 202. In some embodiments, a GUI can be displayed to communicate with the user. By dynamically tracking source code changes, estimating a potential carbon footprint for the plurality of code snippets, and providing simultaneous feedback to the user/code developer, the computer system 200 allows for real-time optimization of the source code.

With continued reference to FIG. 2, the computer system 200 can also perform multi-objective optimization to generate the set of carbon-aware test cases in the form of pareto that satisfies learned or user-specified constraints, such as carbon emissions and code performance. Specifically, carbon-aware test cases can be identified in the form of pareto and recommended to the user by automatically generating a response using a dialogue-based conversation system (e.g., chat/conversational agent 414 in FIG. 4) allowing the user to interact with the carbon-aware test case generator system (i.e., the computer system 200). The computer system 200 using multi-objective optimization techniques generates a set of carbon-aware test cases that satisfies user's constraints, i.e., code performance constraints and carbon emission constraints.

Furthermore, the computer system 200 periodically performs code quality checks for determining code optimization requirements needed to minimize the overall carbon footprint of the system. Additionally, the computer system 200 generates a historical log that records code optimization(s) to enable a user supervision and validate the auto generation of carbon-aware test cases.

In additional embodiments, based on an analysis of the current and predicted carbon footprint for a given plurality of code snippets (e.g., code snippets 230 in FIG. 3), the computer system 200 may estimate a risk associated with the plurality of code snippets or for the overall system in which the plurality of code snippets are used, and assign the plurality of code snippets with a certain confidence level. In some instances, by using advanced analytics algorithms, the risk assessment capability of the computer system 200 may determine a risk of, for example, brand damage based on an estimated probability score of code popularity, code importance, and brand reputation of a given product using the plurality of code snippets.

In embodiments in which the computed risk score exceeds a certain threshold, the computer system 200 may automatically trigger an action. For example, the action may include changing the characteristics of an application's GUI (e.g., coloring) in which the plurality of code snippets are used, triggering an alert for secondary reviewers of the source code, slowing down the application/system, preventing the source code (and the application) not to compile/run/deploy, stopping the source code (and the application) to sync with a remote repository, suggesting an alternative code rewriting that minimizes estimated carbon footprint, etc.

In other embodiments, the computer system 200 may be configured and integrated with existing workflow tools (e.g., GitHub, JIRA, Slack, etc.) to continuously scan source codes for carbon emissions compliance and updating associated knowledge bases.

Figure 5:
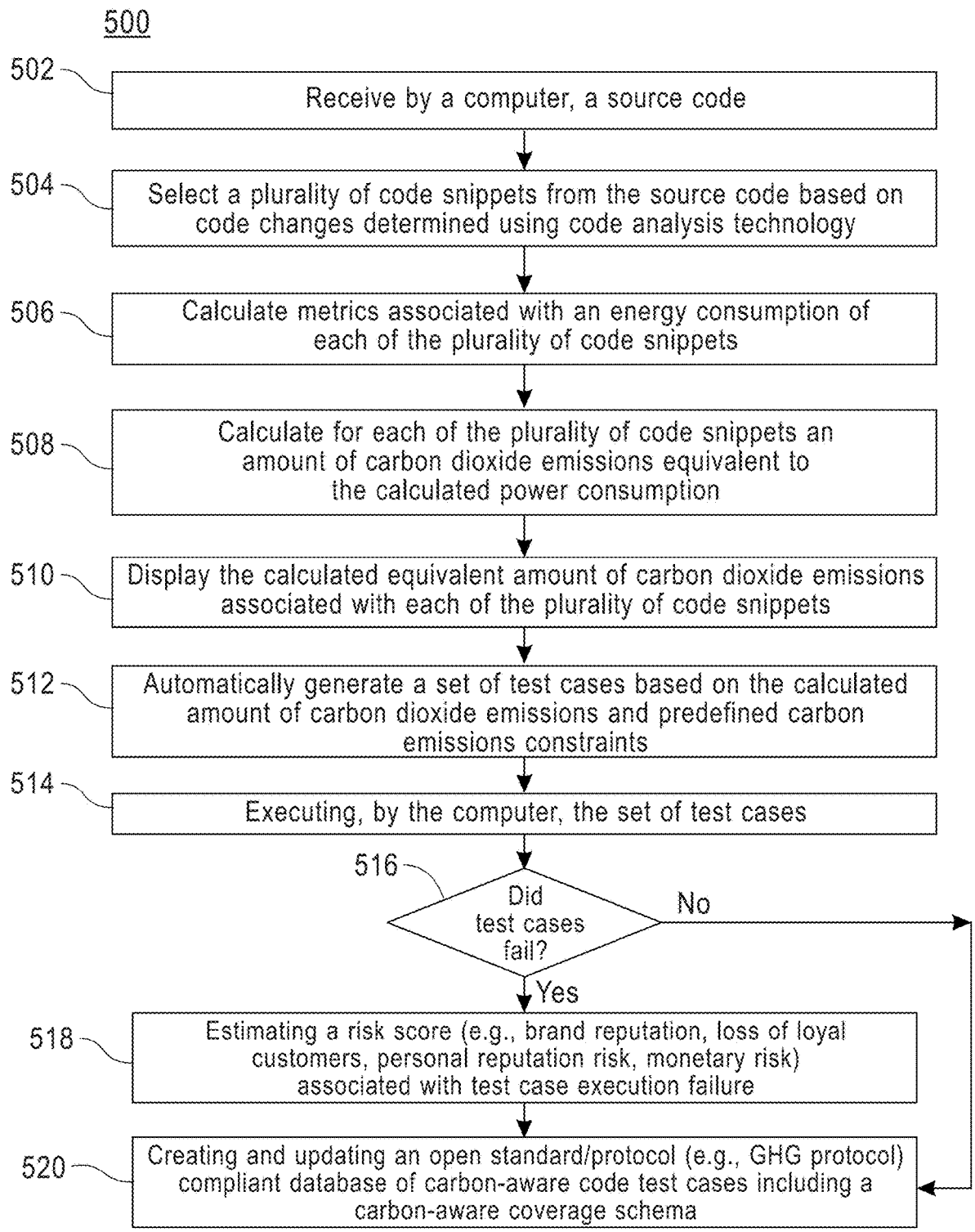
FIG. 5 is a flowchart depicting the steps of a computer-implemented method for generating carbon-aware test cases, according to an embodiment of the present disclosure.

Referring now to FIG. 5, a flowchart 500 illustrating the steps of a computer-implemented method for generating and executing carbon-aware test cases is shown, according to an embodiment of the present disclosure.

The process starts at step 502, by receiving a source code including comments associated with source code changes. The received source code can be obtain by the computer system 200 (FIG. 2) by, for example, connecting to a legacy system that stores legacy code and data, and to a collaborative software development (CSD) and version controlled (VC) platforms that store migrated code. A plurality of code snippets associated with the source code can be received by the computer system 200 (FIG. 2) from the legacy system including code changes information from the CSD/VC platforms subject to migration.

At this step, historical code migration steps are analyzed to understand best practices followed by code developer(s) in the form of, for example, model, library, APIs, microservice based architectures, etc. All major code blocks are represented into an embedding space that captures code module and its corresponding functionality. According to an embodiment, the embedding space can be used for identifying whether a new set of carbon-aware test cases needs to be generated.

At step 504, a first set of code snippets is selected from the plurality of code snippets based, at least in part, on source code changes determined using code analysis technology. At step 506, metrics associated with an energy consumption of each code snippet in the selected first set of code snippets can be calculated by the computer system 200 (FIG. 2). As explained above, energy consumption metrics can be determined by recognizing an amount of energy (e.g., kilowatts-hour of electricity) used during execution of each code snippet in the selected first set of code snippets, and identifying those code snippets consuming the highest amount of energy.

The process continues at step 508 by calculating, for each code snippet in the first set of code snippets, an amount of carbon dioxide emissions equivalent to the calculated energy consumption, and displaying, at step 510, the calculated equivalent amount of carbon dioxide emissions associated with each of the first set of code snippets. The energy consumed by each of the identified code snippets is converted to an equivalent amount of emitted $CO_2$ (e.g., kilograms of $CO_2$) using, for example, existing carbon emission databases.

At step 512, the computer system 200 (FIG. 2) automatically generates a set of test cases based on the calculated amount of carbon dioxide emissions and predefined carbon emissions constraints. According to an embodiment, automatically generating the set of test cases is performed according to a code commit action including at least one of a code commit, a pull request, an approval, an integration, and a coverage plan.

At step 514, the generated set of test cases are executed by the computer system 200 (FIG. 2). In response to executing the set of test cases, a notification is generated for reporting a result of the set of test cases. Specifically, the computer system 200 (FIG. 2) analyzes the source code and performs the generated carbon-aware tests against each of the set of code snippets. In some embodiments, a colored label (e.g., green, yellow, or red) can be assigned based on the carbon emission test results. For example, a green label may indicate a code snippet with lower carbon emissions, whereas a red label may indicate a code snippet with higher carbon emissions. Highlighting code snippets based on the calculated carbon metrics may enable the automated generation of carbon-aware test cases. Further, in an embodiment, real-time input(s) can be received from user(s) and/or code developer(s) via a dialogue-based conversation system. Based on the real-time inputs, updates are performed on the set of test cases. For example, the real-time inputs can include new carbon emission constraints or code requirements.

At step 516, it is determined whether at least one of the carbon-aware test cases has failed. Based on at least one of the test cases being failed, a risk score is estimated at step 518 by the computer system 200 (FIG. 2) according to the test case execution failure. According to an exemplary embodiment, the risk score can be associated with at least one of a brand reputation, customer loss, a reputation risk, and a financial risk.

In response to at least one of the carbon-aware test cases being failed, at step 520, the computer system 200 (FIG. 2) may create and update an open standard/protocol compliance database of carbon-aware test cases including a carbon-aware coverage plan. In an embodiment, based on the carbon-aware coverage plan, one or more test case simulation operations can be modified, including at least one of a union operation, an intersection operation, and a cross-product operation. More specifically, the proposed embodiments can automatically update existing open standard/protocol compliance databases for tracking test case failure along with carbon-aware code coverage details related to carbon-aware constraints.

In some embodiments, an AI-enabled conversational agent (e.g., chat agent 414 in FIG. 4) can be automatically activated to received user's requirements, constraints, and provide corresponding recommendations while executing the carbon-aware test cases.

According to an embodiment, the set of carbon-aware test cases are generated as a part of a set of solutions by solving a multi-objective optimization. The set of solutions near the pareto are recommended to the user by automatically generating a response using a conversational agent. The pareto solutions are identified such that user's carbon emission constraints and code performance constraints are satisfied. Accordingly, carbon-aware test case generation is performed based on user's preferences.

Thus, to enable continuous carbon commission constraints while developing the analytics, code commits are periodically tracked to understand code changes and perform carbon emission test(s) under a user-specified cloud infrastructure. By doing this, new code changes are guaranteed to satisfy carbon emission constraints.

Figure 6:
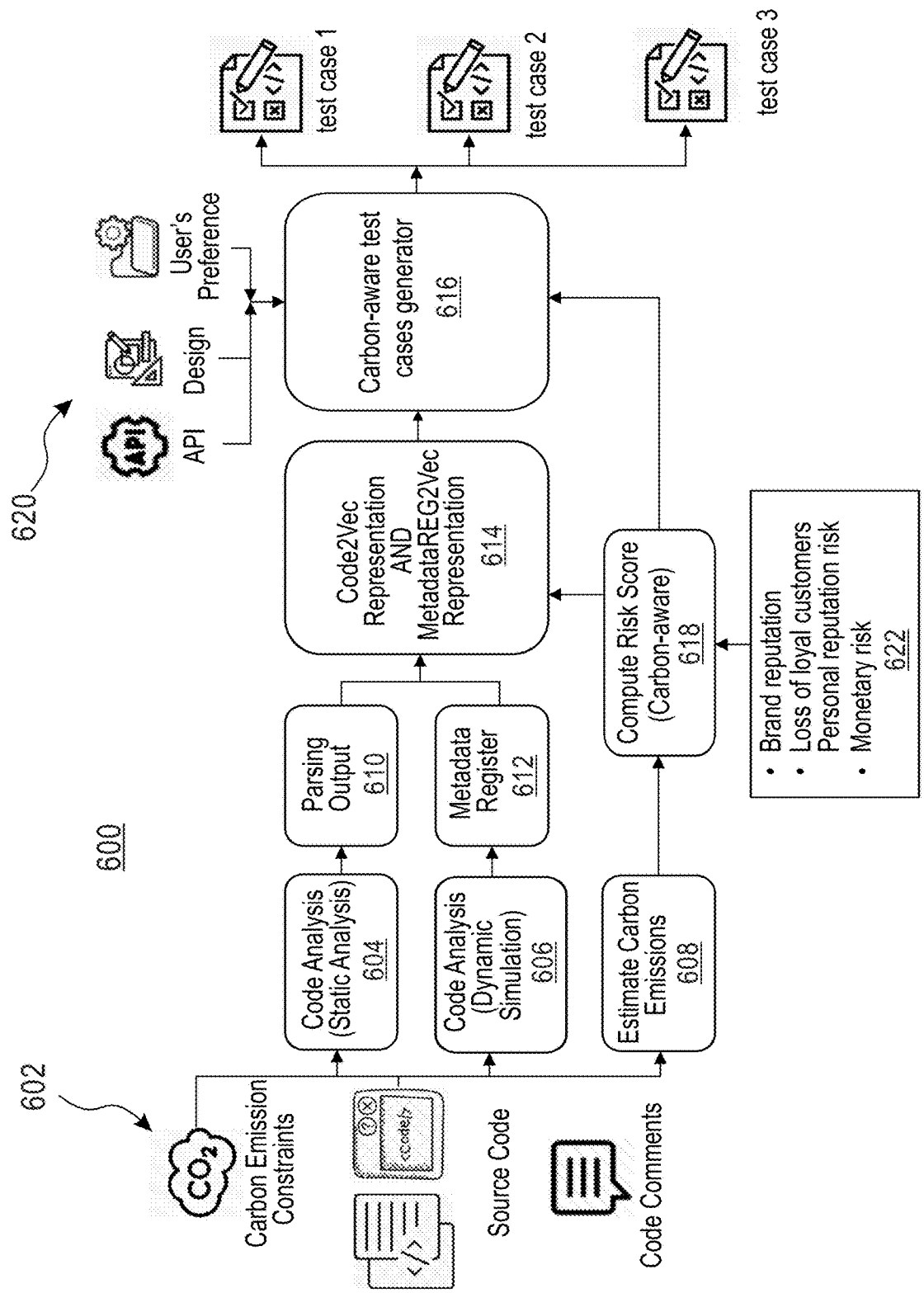
FIG. 6 is a diagram depicting a high-level implementation of the proposed method for generating carbon-aware test cases of FIG. 5, according to an embodiment of the present disclosure.

Referring now to FIG. 6, a diagram depicting a high-level implementation of the proposed method for generating carbon-aware test cases of FIG. 5 is shown, according to an embodiment of the present disclosure.

As described above, predefined carbon emission constraints and source code(s) 602 including code comments are collected and analyzed by the computer system 200 (FIG. 2). Static analysis 604 and dynamic simulation 606 are conducted on the source code to generate a parsing output 610 and metadata register 612, respectively. Simultaneously, carbon emissions 608 are estimated and a risk score 618 is computed including a risk associated to brand reputation, loss of loyal customers, personal and monetary risks 622. The parsing output 610, metadata register 612, and risk score 618 are used to generate a learning distributed representation of code 614 (Code2Vec, MetadataREG2Vec). The generated learning distributed representation of code 614 together with different application programming interfaces (APIs), design, a user's preferences 620 are used by the carbon-aware test case generator 616 for generating a set of carbon-aware test cases (e.g., test case 1, test case 2, test case 3, etc.) based on which compliance of the source code with current and/or user-defined emission regulations can be verified.

The following described embodiments with reference to FIGS. 7-12 illustrate a computer system and method for estimating dependencies between carbon-aware test cases by monitoring a risk associated with test failure, according to another embodiment of the present disclosure. Specifically, the embodiments of FIGS. 7-12 may enable tracking and reduction of carbon emissions via determination of dependencies between carbon-aware test cases. It should be noted that, while the computer system 200 described above with reference to FIG. 2 generates carbon-aware test cases independently of a result of other test cases, the following described embodiments estimate a dependency between generated carbon-aware test cases based on execution logs corresponding to other carbon-aware test cases and a history of test case failure.

Figure 7:
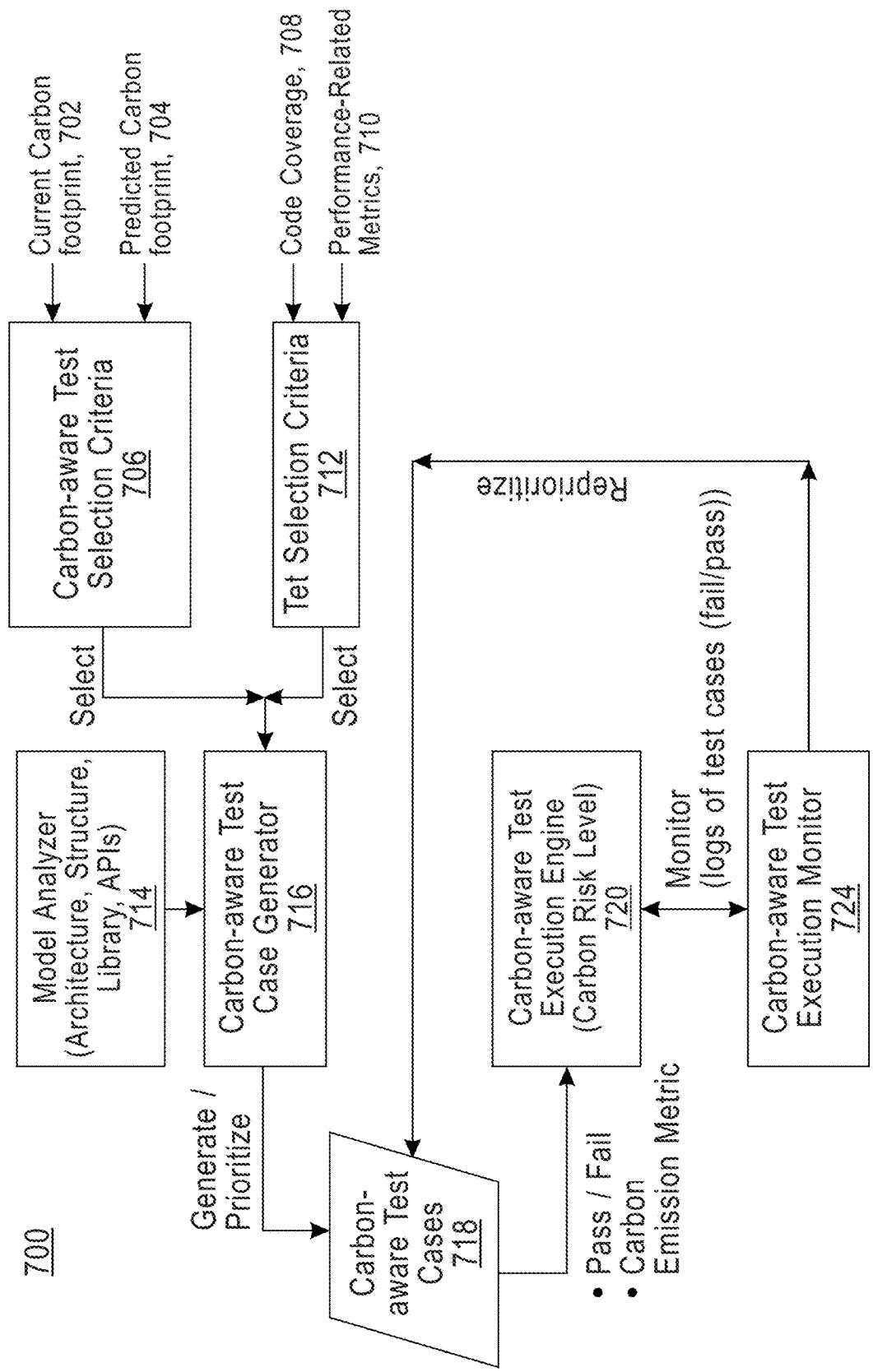
FIG. 7 depicts a computer system for reprioritizing execution of carbon-aware test cases, according to an embodiment of the present disclosure.

Referring now to FIG. 7, a computer system 700 for reprioritizing test cases based on test execution monitoring is shown, according to an embodiment of the present disclosure. In this embodiment, reprioritization is conducted, for example, on carbon-aware test cases generated by the computer system 200 of FIG. 2.

According to an embodiment, the computer system 700 dynamically prioritizes test dependencies based on a calculated risk level and a predicted carbon footprint associated with the source code. Specifically, the computer system 700 dynamically identifies test dependencies between two or more carbon-aware test results along with current and predicted carbon footprint such that carbon footprint can be minimized while executing the carbon-aware test cases (e.g., test cases generated using the computer system 200 of FIG. 2).

As illustrated in the figure, current estimated carbon foot print 702 and predicted carbon footprint 704 can be used by the computer system 700 to define a carbon-aware test selection criteria 706. Simultaneously, the computer system 700 uses code coverage 708 and code performance 710 to define a test selection criteria 712. The computer system 700 uses the defined carbon-aware selection criteria 706 and test selection criteria 712 together with data from a model analyzer 714 to feed a carbon-aware test case generator 716.

The carbon-aware test case generator 716 generates a set of carbon-aware test cases 718. It should be noted that the carbon-aware test case generator 716 operates similarly to the carbon-aware test case generator 108 (FIG. 1) implemented by the computer system 200 (FIG. 2). However, in this embodiment, the carbon-aware test case generator 716 generates the set of carbon-aware test cases 718 by identifying and analyzing code changes, code commits, pull requests along with hierarchical code dependency execution from the current and predicted carbon footprint of the software application. In this embodiment, the carbon-aware test case generator 716 analyzes results from additional test cases and their dependencies based on code coverage 708 and performance-related metrics 710.

According to an embodiment, test case results from a given number of iterations in each case run can be arranged in a triangular matrix as shown in FIGS. 8A-8G. Specifically, FIGS. 8A-8G depict exemplary carbon-aware test triangular matrices 800, 801, 802, 803, 804, 805, and 806 for representing pass and failed test counts and corresponding carbon emission metrics for a first test run.

In this embodiment, FIG. 8A shows an example triangular matrix for arranging test cases results and associated carbon metrics. FIG. 8B shows the triangular matrix of FIG. 8A including passed and failed counts after a first iteration in the first test run. FIG. 8C shows the triangular matrix after the first run including average carbon emissions for passed and failed test cases depicted in FIG. 8B. Similarly, FIG. 8D shows the triangular matrix including passed and failed counts after a second iteration. FIG. 8E shows corresponding average carbon emissions for passed and failed test cases depicted in FIG. 8D. FIG. 8F shows the triangular matrix including passed and failed counts after n iterations. FIG. 8G shows corresponding average carbon emissions for passed and failed test cases depicted in FIG. 8F.

With continued reference to FIG. 7, according to an embodiment, the failure of a carbon-aware test case can be predicted based on the failure of another carbon-aware test case and the monitoring of result logs associated with carbon-aware test case failures. A knowledge base (not shown) of test results can store results associated with test case failure(s). In some embodiments, test case dependency generation may be configured and integrated with existing workflow tools (e.g., Jacoco-Maven-plugin could be integrated with SonarQube, Eclipse, IntelliJ) to continuously scan test cases for carbon footprint compliance and update the knowledge base.

A carbon-aware test execution engine 720 determines a risk level for each of the generated carbon-aware test cases 718 and via a carbon-aware test execution monitor 724, the computer system 700 is capable of tracking a result of the generated carbon-aware test cases 718 (e.g., passed or failed) and arrange test cases in a new order of importance according to the tracked results. Thus, the computer system 700 continuously reprioritize the carbon-aware test cases 718 based on test execution and results along with test case dependencies.

Figure 10A:
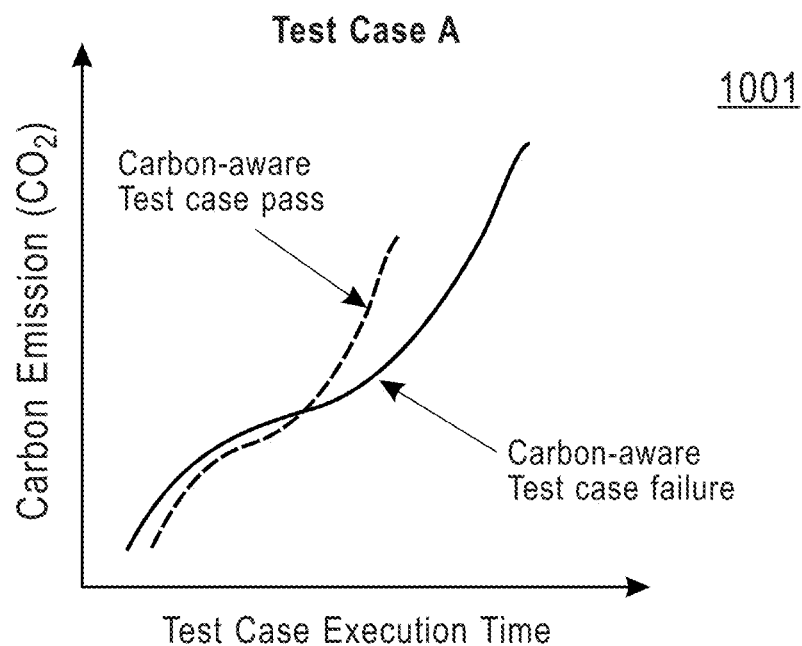
FIGS. 10A-10B depict a result of the test case failure prediction based on dependent carbon emission test results and corresponding carbon risk level, according to an embodiment of the present disclosure.
Figure 10B:
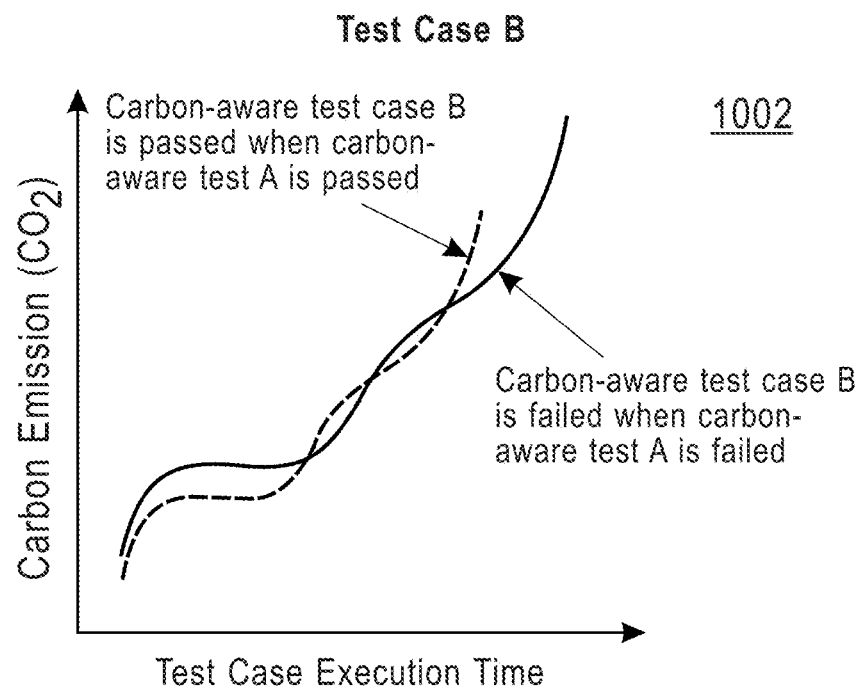

According to an embodiment, a confidence measure for predicting a test case failure from historical information can be based on conditioned probabilities, as shown in FIG. 9A. Specifically, FIG. 9A illustrate prediction of an execution or performance-related failure 902 for a carbon-aware test case based on the failure of another carbon-aware test case using conditional probabilities. In this example, first a carbon-aware test case B is run followed by a carbon-aware test case A. Similarly, FIG. 9AB illustrate prediction of a carbon constraint related failure 904 for the carbon-aware test case based on the failure of another carbon-aware test case using conditional probabilities. As in FIG. 9A, the carbon-aware test case B is run first followed by the carbon-aware test case A. Results from the calculated conditional probabilities are shown in FIGS. 10A-10B. FIG. 10A depicts failure prediction results 1001 for test case A while FIG. 10B shows failure prediction results 1002 for test case B. As shown in the figure, test case B passes the test when test case A passes. Similarly, test case B fails the test when test case A fails.

With continued reference to FIG. 7, the computer system 700 determines a complexity of the carbon-aware test cases 718 based on the risk level to test the model. The computer system 700 analyzes model architecture, code structure, dependencies used, and carbon emission tags to generate a prioritized list of test cases that satisfy code coverage and performance related constraints while minimizing the overall carbon footprint.

In some embodiments, the computer system 700 automatically generates a set of prioritized carbon-aware test cases and dependencies based on the hierarchical carbon constraints to validate the carbon emission criteria. The computer system 700 may also identify changes in the cloud deployment configuration and may reprioritize the carbon-aware test cases and dependencies such that the overall carbon footprint can be minimized while executing all the carbon-aware test cases or non-carbon-aware test cases.

Referring now to FIG. 11, a flowchart 1100 depicting the steps of a computer-implemented method for prioritization of test dependencies is shown, according to an embodiment of the present disclosure. The process starts at step 1102 in response to a test case prioritization request. At this step the computer system 700 (FIG. 7) predicts the likelihood of at least one test case in the set of carbon-aware test cases 718 (FIG. 7) failing. According to an embodiment, the prediction is based on a historic failure of another test case, as explained above with reference to FIGS. 9A-10B. The failure is associated with a test case not complying with a predefined carbon emission constraint. In some embodiments, the failure can be associated with both a code performance failure and a carbon emission failure.

At step 1104, a dependency between at least two test cases in, for example, the set of carbon-aware test cases 718 (FIG. 7) can be determine based on the predicted failure. The process continues at step 1106 by arranging the set of test cases in a new order of importance based on the determined dependency. Stated differently, according to an embodiment, an execution of the set of carbon-aware test cases 718 (FIG. 7) can be reprioritize according to the determined conditional failure and case dependency.

Figure 12:
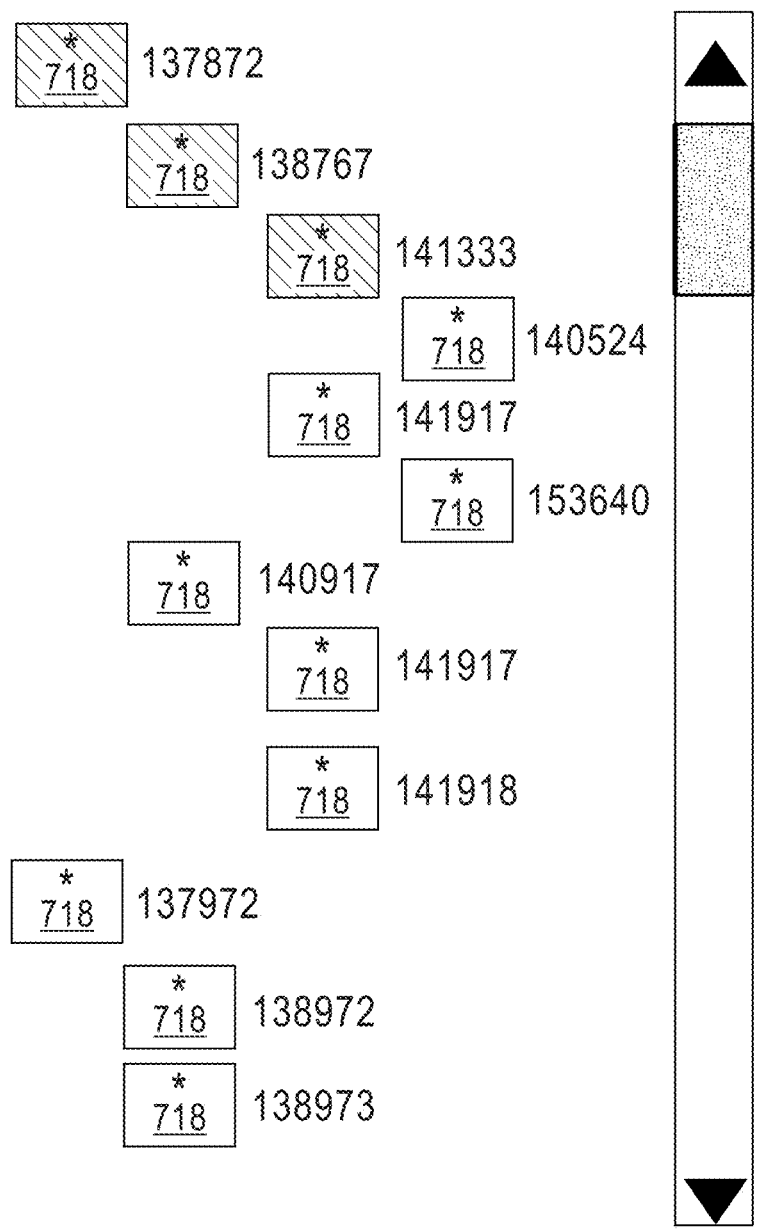
FIG. 12 depicts an example of an autogenerated test structure for minimizing carbon emissions during test case execution, according to an embodiment of the present disclosure.

For example, FIG. 12 shows an exemplary autogenerated test structure 1200 including case dependencies. In this example, the proposed embodiments can generate and display a optimized execution sequence for the set of carbon-aware test cases 718 based on the failure analysis and dependency estimation. In the example of FIG. 12, the top test cases (i.e., 137872, 138767, and 141333) of the set of carbon-aware test cases 718 have been identified by the computer system 700 (FIG. 7) as compliant with carbon emissions constraints and can be executed first for minimizing carbon emissions. In some embodiments, a risk level associated with the predicted failure can be calculated for the set of carbon-aware test cases 718. Continuous monitoring of execution logs associated with the set of carbon-aware test cases 718 can be conducted including the monitoring of the calculated risk level associated with the predicted failure.

Figure 13:
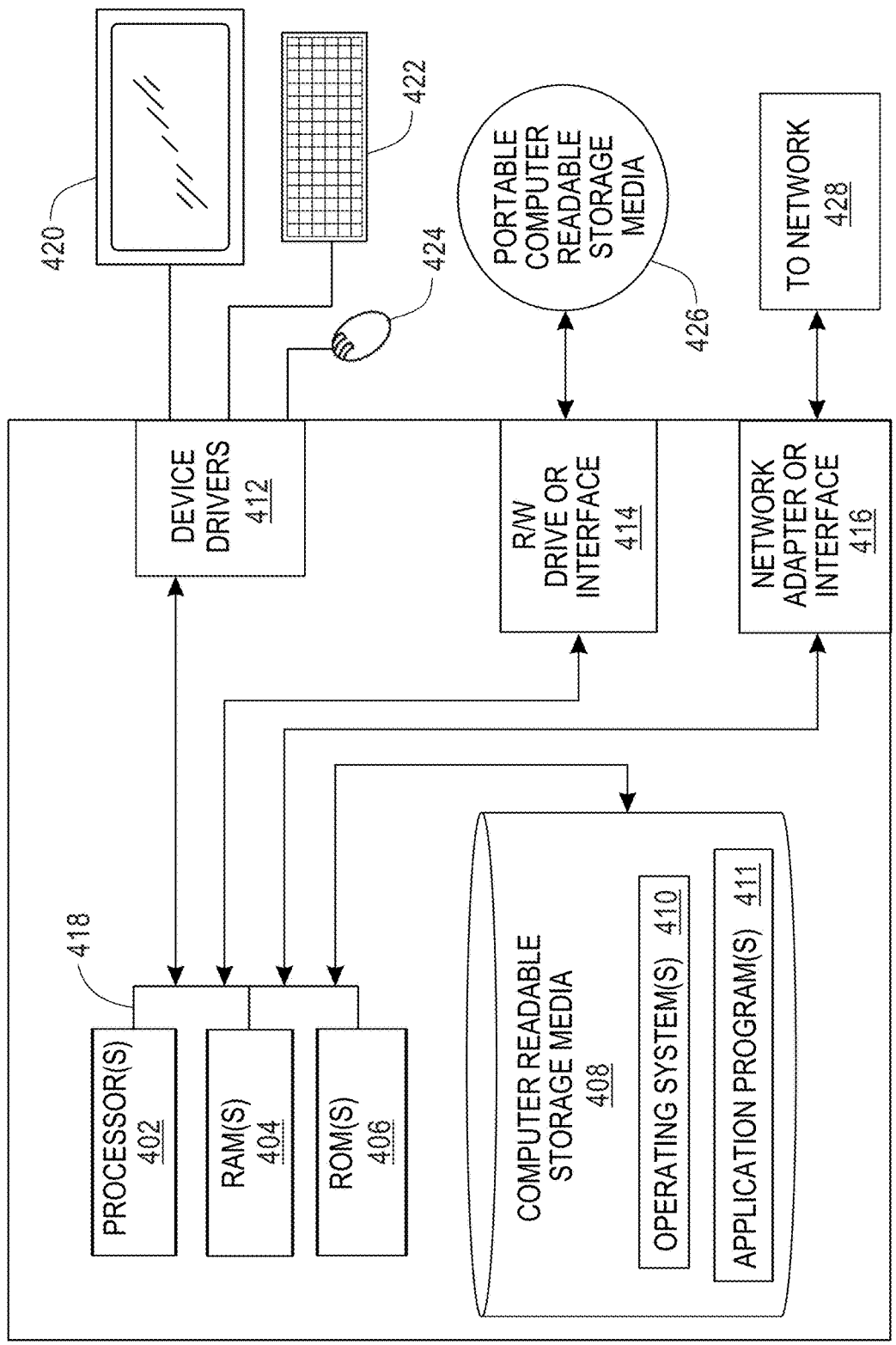
FIG. 13 is a block diagram of internal and external components of a computer system, according to an embodiment of the present disclosure.

Referring now to FIG. 13, a block diagram of components of client computer 102 and server computer 114 of networked computer environment 100 of FIG. 1 is shown, according to an embodiment of the present disclosure. It should be appreciated that FIG. 13 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
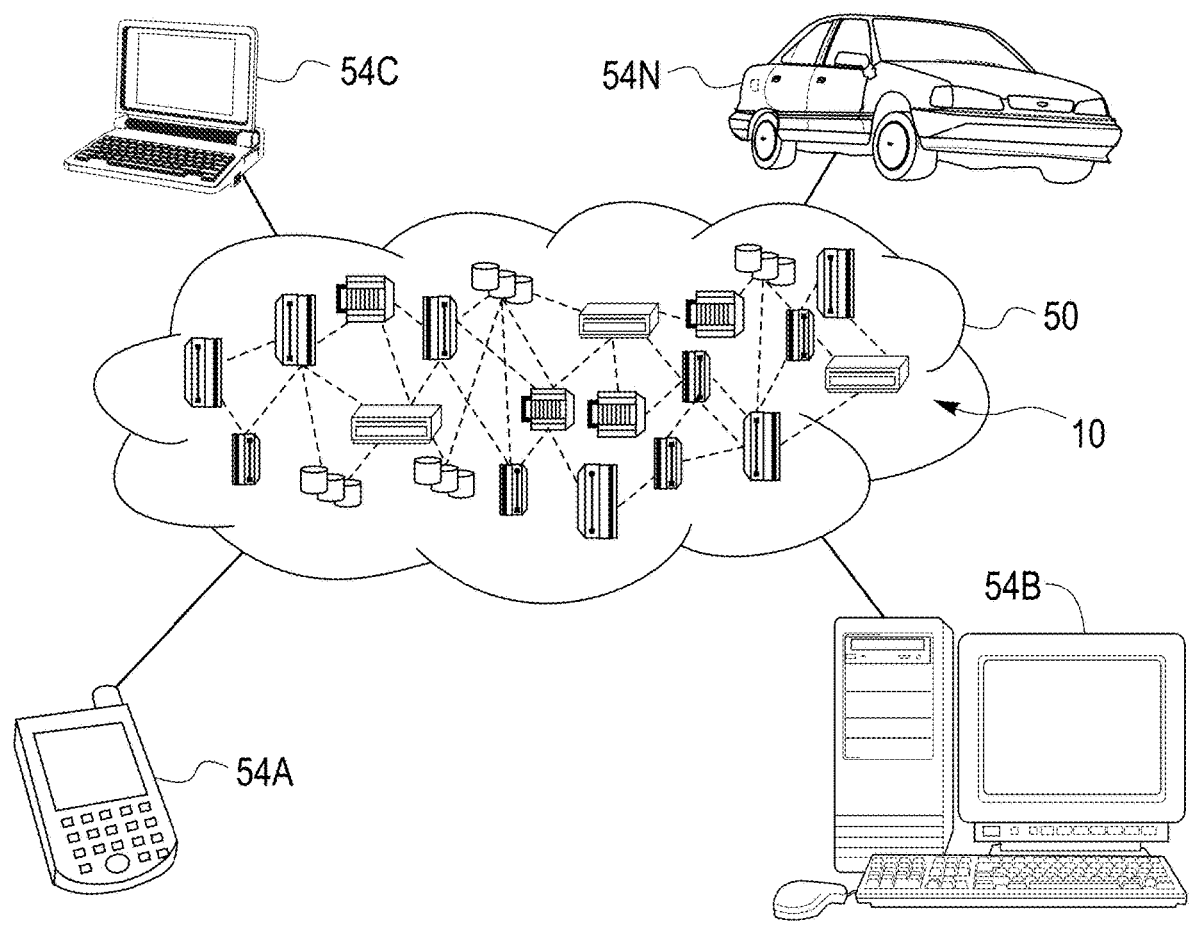
FIG. 14 is a block diagram of an illustrative cloud computing environment, according to an embodiment of the present disclosure.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
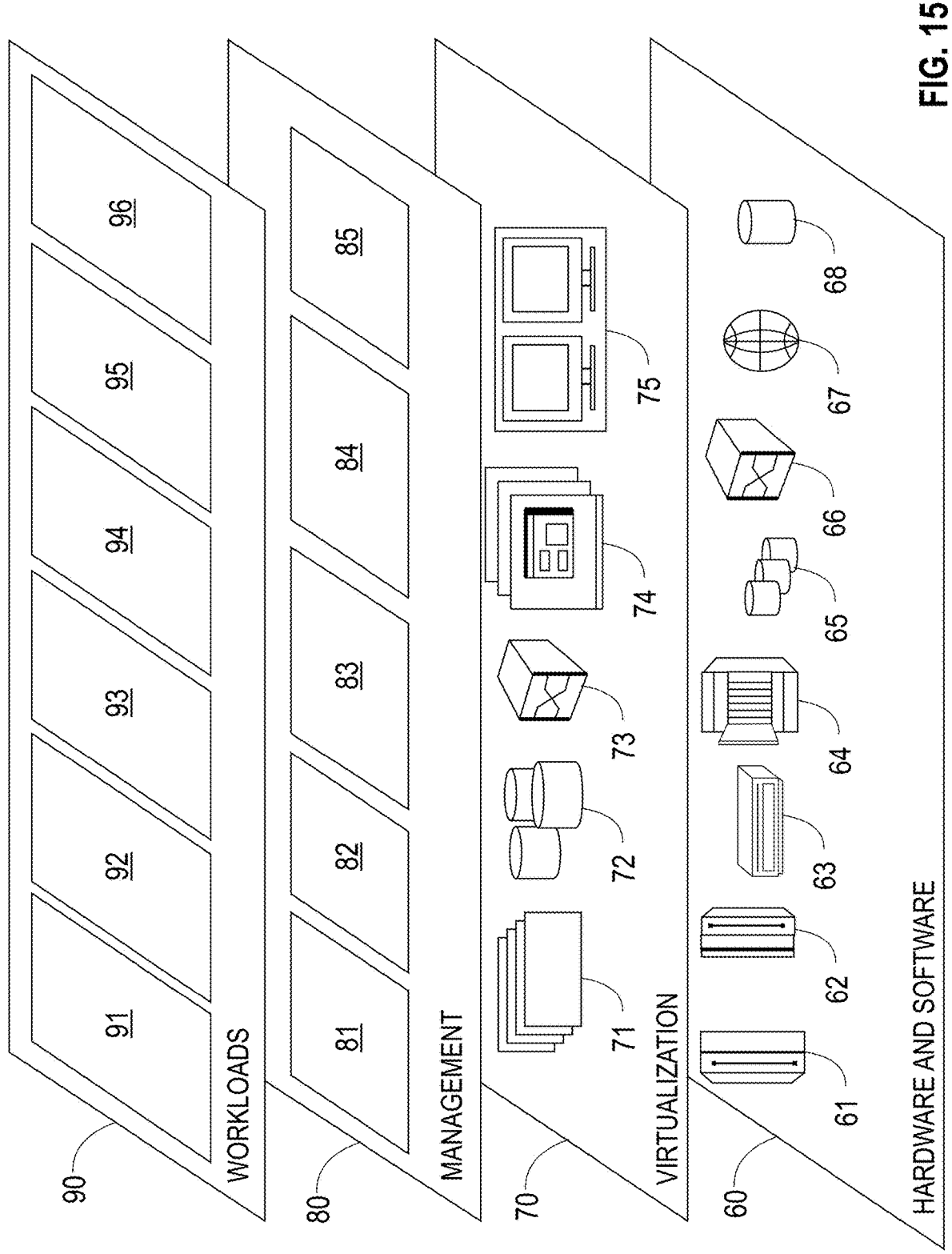
FIG. 15 is a block diagram of functional layers of the illustrative cloud computing environment of FIG. 14, according to an embodiment of the present disclosure.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for carbon-aware test case generation 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a set of test cases, comprising:

receiving, by one or more processors, a source code;

using, by the one or more processors, code analysis technology for identifying code changes on the received source code and selecting a plurality of code snippets based on the identified code changes;

calculating, by the one or more processors, metrics associated with an energy consumption of each of the plurality of code snippets;

calculating, by the one or more processors, for each of the plurality of code snippets an amount of carbon dioxide emissions equivalent to the calculated metrics;

displaying, by the one or more processors, the calculated equivalent amount of carbon dioxide emissions associated with each of the plurality of code snippets on the source code; and automatically generating, by the one or more processors, a set of test cases based on the calculated amount of carbon dioxide emissions and predefined carbon emissions constraints.

2. The method of claim 1, further comprising:

executing, by the one or more processors, the set of test cases;

generating, by the one or more processors, a notification for reporting a result of the set of test cases;

receiving, by the one or more processors, a real-time input from a user via a dialogue-based conversation system; and updating, by the one or more processors, the set of test cases based on the received real-time input from the user.

3. The method of claim 1, wherein source code changes are determined according to a code commit action including at least one of a code commit, a pull request, an approval, an integration, and a coverage plan.

4. The method of claim 1, further comprising:

calculating, by the one or more processors, a risk score associated with test case execution failure.

5. The method of claim 4, wherein the risk score is associated with at least one of a brand reputation, customer loss, a reputation risk, and a financial risk.

6. The method of claim 1, further comprising:

creating, by the one or more processors, a compliance database of carbon-aware test cases including a carbon-aware coverage plan; and updating, by the one or more processors, the compliance database of carbon-aware test cases based on an execution log.

7. The method of claim 6, further comprising:

based on the carbon-aware coverage plan, modifying, by the one or more processors, one or more test case simulation operations including at least one of a union operation, an intersection operation, and a cross-product operation.

8. The method of claim 1, further comprising:

in response to a test case prioritization request, predicting, by the one or more processors, a failure of at least one test case in the set of test cases based on a failure of a different test case using conditional probability;

based on the predicted failure, determining, by the one or more processors, a dependency between at least two test cases in the set of test cases; and based on the determined dependency, arranging the set of test cases in a new order of importance.

9. The method of claim 8, further comprising:

calculating, by the one or more processors, a risk level associated with the predicted failure.

10. The method of claim 9, further comprising:

monitoring, by the one or more processors, an execution log associated with the set of test cases including the calculated risk level associated with the predicted failure.

11. A computer system for generating a set of test cases, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving, by one or more processors, a source code;

using, by the one or more processors, code analysis technology for identifying code changes on the received source code and selecting a plurality of code snippets based on the identified code changes;

calculating, by the one or more processors, metrics associated with an energy consumption of each of the plurality of code snippets;

calculating, by the one or more processors, for each of the plurality of code snippets an amount of carbon dioxide emissions equivalent to the calculated metrics;

displaying, by the one or more processors, the calculated equivalent amount of carbon dioxide emissions associated with each of the plurality of code snippets on the source code; and automatically generating, by the one or more processors, a set of test cases based on the calculated amount of carbon dioxide emissions and predefined carbon emissions constraints.

12. The computer system of claim 11, further comprising:

executing, by the one or more processors, the set of test cases;

generating, by the one or more processors, a notification for reporting a result of the set of test cases;

receiving, by the one or more processors, a real-time input from a user via a dialogue-based conversation system; and updating, by the one or more processors, the set of test cases based on the received real-time input from the user.

13. The computer system of claim 11, wherein source code changes are determined according to a code commit action including at least one of a code commit, a pull request, an approval, an integration, and a coverage plan.

14. The computer system of claim 11, further comprising:

calculating, by the one or more processors, a risk score associated with test case execution failure.

15. The computer system of claim 14, wherein the risk score is associated with at least one of a brand reputation, customer loss, a reputation risk, and a financial risk.

16. The computer system of claim 11, further comprising:

creating, by the one or more processors, a compliance database of carbon-aware test cases including a carbon-aware coverage plan; and updating, by the one or more processors, the compliance database of carbon-aware test cases based on an execution log.

17. The computer system of claim 16, further comprising:
based on the carbon-aware coverage plan, modifying, by the one or more processors, one or more test case simulation operations including at least one of a union operation, an intersection operation, and a cross-product operation.

18. The computer system of claim 11, further comprising:
in response to a test case prioritization request, predicting, by the one or more processors, a failure of at least one test case in the set of test cases based on a failure of a different test case using conditional probability;
based on the predicted failure, determining, by the one or more processors, a dependency between at least two test cases in the set of test cases; and
based on the determined dependency, arranging the set of test cases in a new order of importance.

19. The computer system of claim 18, further comprising:
calculating, by the one or more processors, a risk level associated with the predicted failure.

20. The computer system of claim 19, further comprising:
monitoring, by the one or more processors, an execution log associated with the set of test cases including the calculated risk level associated with the predicted failure.

* * * * *